A. STEINKOENIG.
FILTER.
APPLICATION FILED SEPT. 13, 1909.

966,963.

Patented Aug. 9, 1910.

Witnesses
T. S. Wittekind
C. W. Miles

Inventor
Adam Steinkoenig
By Walter F. Murray
Attorney

UNITED STATES PATENT OFFICE.

ADAM STEINKOENIG, OF CINCINNATI, OHIO.

FILTER.

966,963. Specification of Letters Patent. Patented Aug. 9, 1910.

Application filed September 13, 1909. Serial No. 517,386.

*To all whom it may concern:*

Be it known that I, ADAM STEINKOENIG, a citizen of the United States of America, and resident of Cincinnati, in the county of Hamilton and State of Ohio, have invented certain new and useful Improvements in Filters, of which the following is a specification.

The object of my invention is a filter which is provided with a filtering medium which will thoroughly filter the liquid and may be handled rapidly for placing it in and removing it from the casing, and in which the filtering medium is supported by a means which permits a rapid passing of the liquid from the filtering chamber to the exit chamber.

Figure 1:
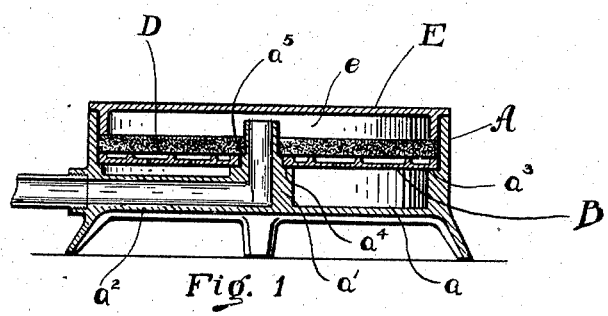
Figure 2:
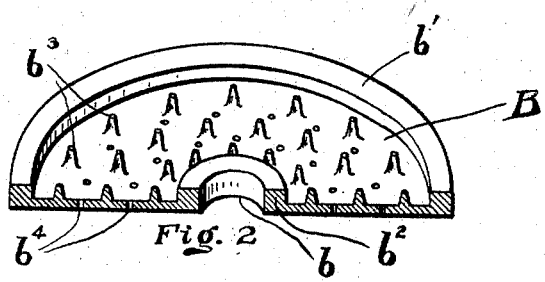

Referring to the accompanying drawings which form a part hereof: Figure 1 is a central longitudinal sectional view of a filter embodying my invention. Fig. 2 is a perspective view upon a somewhat enlarged scale of one half of the plate embodying my invention.

Referring to the parts, the casing consists of a shallow cylindrical vessel A upon the bottom $a$ of which a central vertical pipe $a'$ is formed. Into pipe $a'$ a pipe $a^2$ leads. Pipe $a^2$ is formed integral with the bottom $a$ and the pipe $a'$. Vessel A has an annular shoulder $a^3$, and at the level of the shoulder $a^3$ pipe $a'$ has a shoulder $a^4$, upon which at a distance from shoulder $a^4$ equal to the thickness of the filtering plate is a second shoulder $a^5$. A plate B rests upon the shoulder $a^3$—$a^4$. The diameter of plate B is equal to the inner diameter of vessel A. The plate has a central opening $b$ equal to the diameter of pipe $a'$ between the shoulder $a^4$—$a^5$. Plate B has annular ridges $b'$ $b^2$ upon its periphery and around perforation $b$, respectively. Between the ridges plate B has formed upon it a series of studs $b^3$ which are in the shape of truncates of cones. These studs are of the height of the ridges $b'$ $b^2$ and are located upon concentric circles. Between the circles, upon which the lugs are located, the plate has a series of perforations $b^4$.

The filtering medium consists of a circular disk D of paper pulp, which has been compressed to a degree, such as to retain its shape under the pressure to which it is put, when it is supported by the studs $b^3$ and the ridges $b'$ $b^2$. Disk D is of the same diameter as the plate B, and has a central perforation so that the disk will pass over the pipe $a'$ and rest upon the shoulder $a^5$.

Cover E has a downwardly extending flange $e$, which fits within the upper end of the casing A, and contacts with the upper face of the disk.

In use the liquid to be filtered, is admitted under pressure to pipe $a^2$. This pressure maintains a pressure within the casing between cover E and disk D. This pressure assists in forcing the liquid through the disk D, which being supported by the ridges $b'$ $b^2$, and the studs $b^3$, retains its shape, so that the liquid which passes into the spaces between the disk D and the plate B has a free exit into the bottom of the vessel A through the perforations $b^4$.

What I claim is:

1. In a filter the combination of a shallow cylindrical vessel having a central pipe upon its bottom and means for supplying fluid under pressure to said pipe, a perforated plate mounted within the vessel and surrounding the pipe, said plate having a series of upwardly projecting studs which form a flat support for the filtering disk, the disk consisting of compressed pulp, and a cover adapted to hold the disk in contact with the plate.

2. In a filter the combination of a shallow cylindrical vessel having a central vertical pipe projecting upwardly from its bottom, means of supplying liquid to be filtered, under pressure to said pipe, a plate consisting of a circular disk having a central perforation with an annular ridge surrounding the perforation an annular ridge around the edge of the plate and a series of upwardly projecting studs located upon concentric circles and perforations through the plate between the studs, and a circular disk of paper pulp, supported by the plate and with a central perforation to pass the pipe, and a cover with a downwardly projecting annular flange adapted to contact with the disk.

ADAM STEINKOENIG.

Witnesses:
WALTER F. MURRAY,
W. THORNTON BOGERT.